United States Patent
Li et al.

(10) Patent No.: US 12,201,929 B2
(45) Date of Patent: Jan. 21, 2025

(54) FRAME WITH HINGED COVER

(71) Applicant: JIANGSU LANSHAN PURIFICATION TECHNOLOGY CO., LTD., Suqian (CN)

(72) Inventors: Hao Li, Suqian (CN); Shaowen Su, Suqian (CN)

( * ) Notice: Subject to any disclaimer, the term of this patent is extended or adjusted under 35 U.S.C. 154(b) by 374 days.

(21) Appl. No.: 17/809,895

(22) Filed: Jun. 29, 2022

(65) Prior Publication Data

US 2022/0362699 A1    Nov. 17, 2022

Related U.S. Application Data

(63) Continuation of application No. PCT/CN2022/092904, filed on May 14, 2022.

(51) Int. Cl.
*B01D 46/00* (2022.01)
*B01D 46/52* (2006.01)

(52) U.S. Cl.
CPC ..... *B01D 46/0005* (2013.01); *B01D 46/0004* (2013.01); *B01D 46/521* (2013.01)

(58) Field of Classification Search
CPC ....... F24F 1/58; B01D 46/0039; B01D 46/10; B01D 46/12; B01D 46/30; B01D 46/52; B01D 46/88; B01D 46/521; B01D 46/0005
USPC .......... 55/467, 493, 496, 497, 499, 511, 521
See application file for complete search history.

(56) References Cited

U.S. PATENT DOCUMENTS

| | | | | |
|---|---|---|---|---|
| 5,797,975 | A * | 8/1998 | Davis | B01D 46/12 55/491 |
| 11,731,066 | B2 * | 8/2023 | Barry | B01D 46/521 55/496 |
| 2004/0172928 | A1 * | 9/2004 | Kubokawa | B01D 46/0005 55/497 |
| 2007/0084167 | A1 * | 4/2007 | Ticknor | B01D 46/10 55/484 |
| 2008/0264021 | A1 * | 10/2008 | Hoover | F24F 1/58 55/493 |
| 2009/0320426 | A1 * | 12/2009 | Braunecker | B01D 46/12 55/511 |
| 2010/0300052 | A1 * | 12/2010 | Porter | B01D 46/10 55/499 |
| 2015/0267927 | A1 * | 9/2015 | Zhang | B01D 46/521 55/497 |
| 2023/0271126 | A1 * | 8/2023 | Kim | B01D 46/0039 55/467 |

FOREIGN PATENT DOCUMENTS

CN     221359058 U   *   7/2024

* cited by examiner

*Primary Examiner* — Minh Chau T Pham

(57) ABSTRACT

A frame with a hinged cover is provided, including four frames connected to each other form a rectangular main frame, and at least one edge of the four frames is provided with a hinged cover assembly. The hinged cover assembly includes a hinged cover main body, a hinged cover edge, and an arc-shaped spring piece. The hinged cover edge can be turned around the hinged cover main body; one end of the arc-shaped spring piece is clamped to the hinged cover main body, the other end of the arc-shaped spring piece is clamped to the hinged cover edge. The frame adopts a turn up design, uses an arc-shaped spring piece to play a limit function, and the whole frame can be tightly closed without shaking after being turned up and closed.

10 Claims, 3 Drawing Sheets

FRAME WITH HINGED COVER

CROSS-REFERENCE TO RELATED APPLICATION

This application is a continuation of International Patent Application Number PCT/CN2022/092904, filed on May 14, 2022, which claims the benefit and priority of Chinese Patent Application Number 202110533480.8, filed on May 17, 2021. The entire disclosure of each of the foregoing applications is incorporated herein by reference in its entirety.

TECHNICAL FIELD

The present disclosure relates to a frame with a hinged cover.

BACKGROUND

Filters are widely used in purification at many fields, such as central air conditioning and ventilation systems, pharmaceuticals, hospital, electronics, food and other industry, which can also be used as the front-end filtration of high-efficiency particulate air filters to reduce the load of high-efficiency particulate air filters and prolong their service life.

At present, the filter frame is usually fixed with screws, which requires tools to disassemble during replacement, resulting in time-consuming and labor-consuming. Further, it is also very easy to accumulate damage to the filter frame during the process of replacement with tools such as screwdriver.

In addition, most of the traditional filters are disposable, with large transportation volume, high cost, high scrap disposal cost and waste of resources. A few of the traditional filters are replaceable, but the replacement process is very cumbersome and difficult to operate, and the cost of recycling after one-time scrap is high.

SUMMARY

The object of the present disclosure is to solve the deficiencies of the related art, and a frame with a hinged cover is provided, which includes four frames, wherein the four frames are connected to each other form a rectangular main frame, and at least one edge of the four frames is provided with a hinged cover assembly;
the hinged cover assembly includes:
a hinged cover main body;
a hinged cover edge, wherein the hinged cover edge is capable of being turned around the hinged cover main body; and
an arc-shaped spring piece, wherein the arc-shaped spring piece is in an arc shape, one end of the arc-shaped spring piece is clamped to the hinged cover main body, the other end of the arc-shaped spring piece is clamped to the hinged cover edge, and an elastic force generated by the arc-shaped spring piece acts on the hinged cover main body and the hinged cover edge.

As a preferred technical solution, an center point of the hinged cover edge turning around the hinged cover main body and an acting point of the arc-shaped spring piece on the hinged cover main body are located at different positions.

As a preferred technical solution, the hinged cover assembly includes one or more arc-shaped spring piece.

As a preferred technical solution, a range of a flip angle that the hinged cover edge turns around the hinged cover main body is 90-180 degrees.

As a preferred technical solution, a range of a radian of the arc-shaped spring piece is 35-150 degrees.

As a preferred technical solution, the frame with a hinged cover further includes a filter screen, and the filter screen is arranged in the main frame.

As a preferred technical solution, the four frames are provided with a hollow structure respectively.

As a preferred technical solution, the hollow structure includes an upper hollow structure, a middle hollow structure and a lower hollow structure from top to bottom.

As a preferred technical solution, an upper end of the upper hollow structure is provided with an opening, the hinged cover main body is located in the upper hollow structure, and an lower end of the lower hollow structure is provided with an opening.

As a preferred technical solution, the frame with a hinged cover further includes a keel, and the keel is configured to support the filter screen.

The advantageous effects of the present disclosure are as follows:

The frame is designed to be turned up and the arc-shaped spring piece is used to play a limit function, which has certain resistance and tension when the frame is opened and closed. The whole frame can be tightly closed without shaking after being turned up and closed.

The filter material support uses the reinforced keel design, so that each folded section of the material can ensure the uniform spacing, which can play the role of overall reinforcement. The keel adopts the upper and lower snap fit structure, the frame can be turned up to close the cover plate to take out and replace the consumables, and the keel can be reused.

The above and other features, aspects and advantages of the present application are more easily understood with reference to the following detailed description.

BRIEF DESCRIPTION OF THE DRAWINGS

Other features, objects and advantages of the present disclosure will become more apparent by reading the detailed description of the non-restrictive embodiments with reference to the following drawings.

REFERENCE MARKS IN THE DRAWINGS

1—frame; 2—main frame; 3—hinged cover assembly; 31—hinged cover main body; 32—hinged cover edge; 4—arc-shaped spring piece; 5—filter screen; 11—hollow structure; 111—upper hollow structure; 112—middle hollow structure; 113—lower hollow structure; 6—keel.

DETAILED DESCRIPTION OF THE EMBODIMENTS

In order to make the object, technical solution and advantages of the embodiment of the present disclosure more clear, the technical solution of the embodiment of the present disclosure will be clearly and completely described below in combination with the attached drawings of the embodiment of the present disclosure. It is apparent that the described embodiments are part of the embodiments of the present disclosure, not all of them. Based on the described embodiments of the present disclosure, all other embodiments obtained by those skilled in the art without creative work shall be within the scope of the present disclosure.

Unless otherwise defined, the technical terms or scientific terms used herein shall have the general meaning understood by those skilled in the art. "First", "second" and similar terms used in the description and the claims of the present disclosure do not mean any order, quantity or importance, but are only used to distinguish different components. Similarly, terms like "one" or "a/an" do not mean a quantitative limitation to elements, but at least one of the element.

Figure 1:
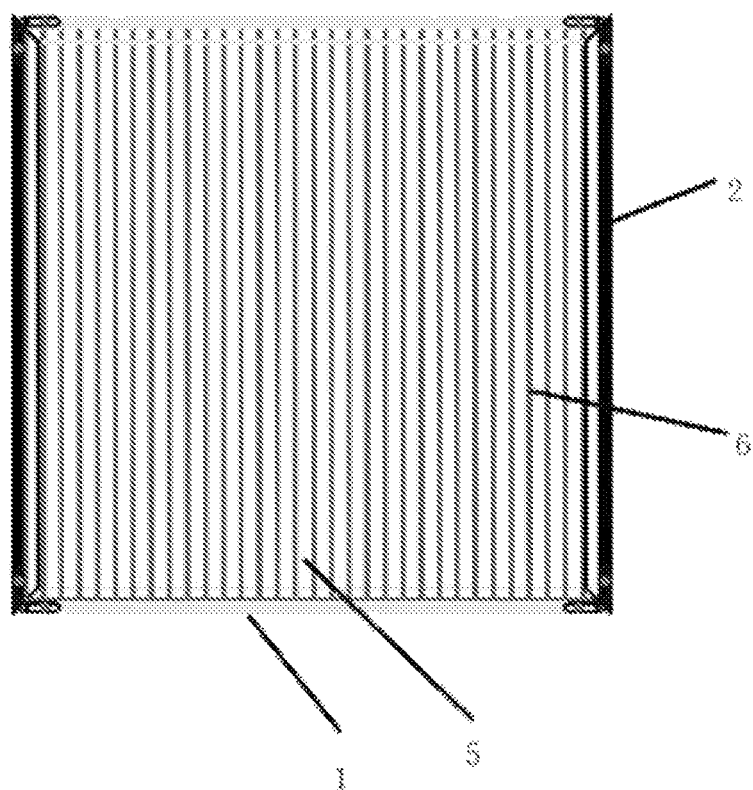
FIG. 1 is the structural diagram of the frame with a hinged cover.
Figure 2:
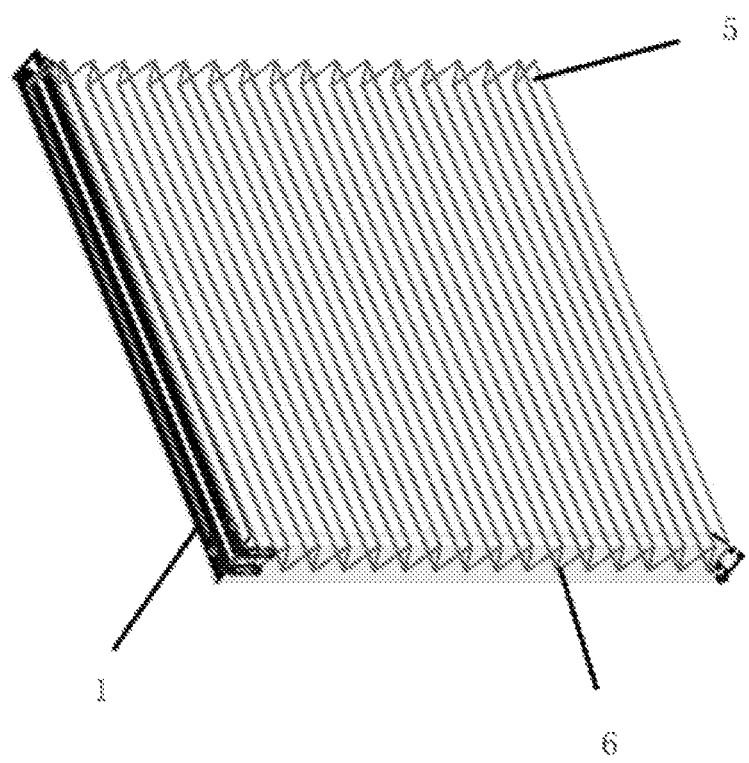
FIG. 2 is the perspective view of the frame with a hinged cover.
Figure 3:
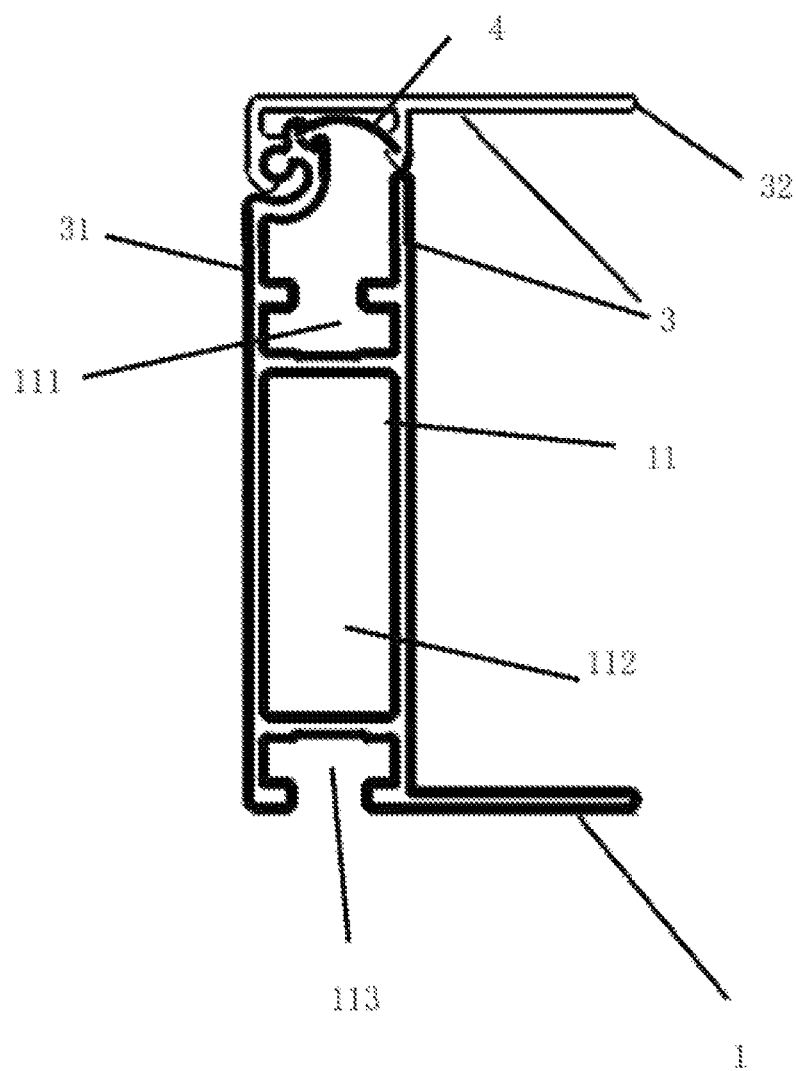
FIG. 3 is the cross-sectional diagram of the frame of the frame with a hinged cover.

As shown in FIG. 1 to FIG. 3, a frame with a hinged cover includes four frames 1, wherein the four frames 1 are connected to each other form a rectangular main frame 2, and at least one edge of the four frames 1 is provided with a hinged cover assembly 3.

The hinged cover assembly 3 includes:
a hinged cover main body 31;
a hinged cover edge 32, wherein the hinged cover edge 32 is capable of being turned around the hinged cover main body 31; and
an arc-shaped spring piece 4, wherein the arc-shaped spring piece 4 is in an arc shape, one end of the arc-shaped spring piece 4 is clamped to the hinged cover main body 31, the other end of the arc-shaped spring piece 4 is clamped to the hinged cover edge 32, and an elastic force generated by the arc-shaped spring piece 4 acts on the hinged cover main body 31 and the hinged cover edge 32.

As a preferred embodiment, the center point of the hinged cover edge 32 turning around the hinged cover main body 31 and the acting point of the arc-shaped spring piece 4 on the hinged cover main body 31 are located at different positions.

As a preferred embodiment, the hinged cover assembly 3 includes one or more arc-shaped spring piece 4.

As a preferred embodiment, the range of the flip angle that the hinged cover edge 32 turns around the hinged cover main body 31 is 90-180 degrees.

As a preferred embodiment, the range of the radian of the arc-shaped spring piece 4 is 35-150 degrees.

As a preferred embodiment, the frame with a hinged cover further includes a filter screen 5, and the filter screen 5 is arranged in the main frame 2.

As a preferred embodiment, the four frames are provided with a hollow structure 11 respectively.

As a preferred embodiment, the hollow structure 11 includes an upper hollow structure 111, a middle hollow structure 112 and a lower hollow structure 113 from top to bottom.

As a preferred embodiment, the upper end of the upper hollow structure 111 is provided with an opening, and the hinged cover main body 31 is located in the upper hollow structure 111.

As a preferred embodiment, the lower end of the lower hollow structure 113 is provided with an opening.

As a preferred embodiment, the frame with a hinged cover further includes a keel 6, and the keel 6 is configured to support the filter screen 5.

The frame 1 is designed to be turned up and the arc-shaped spring piece 4 is used to play a limit function, which has certain resistance and tension when the frame 1 is opened and closed. The whole frame 1 can be tightly closed without shaking after being turned up and closed.

The above shows and describes the basic principles, main features and advantages of the present disclosure. It is obvious to those skilled in the art that the present disclosure is not limited to the details of the above exemplary embodiments, and can be realized in other specific forms without departing from the spirit or basic features of the present disclosure. Therefore, from any point of view, the embodiments should be regarded as exemplary and not a limitation. The scope of the present disclosure is limited by the appended claims rather than the above description. Therefore, it is intended to include all changes within the meaning and scope of the equivalent elements of the claims in the present disclosure. Any reference numerals in the claims shall not be regarded as a limitation to the claims involved.

In addition, it should be understood that the specification is described in accordance with the embodiments, but not every embodiment contains only one independent technical solution. The description in the specification is only for clarity, those skilled in the art should take the description as a whole, and the technical solutions in each embodiment can also be properly combined to form other embodiments that can be understood by those skilled in the art.

What is claimed is:

1. A frame with a hinged cover, comprising four frames, wherein the four frames are connected to each other form a rectangular main frame, and at least one edge of the four frames is provided with a hinged cover assembly;
   the hinged cover assembly comprises:
   a hinged cover main body;
   a hinged cover edge, wherein the hinged cover edge is capable of being turned around the hinged cover main body; and
   an arc-shaped spring piece, wherein the arc-shaped spring piece is in an arc shape, one end of the arc-shaped spring piece is clamped to the hinged cover main body, the other end of the arc-shaped spring piece is clamped to the hinged cover edge, and an elastic force generated by the arc-shaped spring piece acts on the hinged cover main body and the hinged cover edge.

2. The frame with the hinged cover according to claim 1, wherein an center point of the hinged cover edge turning around the hinged cover main body and an acting point of the arc-shaped spring piece on the hinged cover main body are located at different positions.

3. The frame with the hinged cover according to claim 1, wherein the hinged cover assembly comprises one or more arc-shaped spring piece.

4. The frame with the hinged cover according to claim 1, wherein a range of a flip angle that the hinged cover edge turns around the hinged cover main body is 90-180 degrees.

5. The frame with the hinged cover according to claim 1, wherein a range of a radian of the arc-shaped spring piece is 35-150 degrees.

6. The frame with the hinged cover according to claim 1, wherein the frame with a hinged cover further comprises a filter screen, and the filter screen is arranged in the main frame.

7. The frame with the hinged cover according to claim 1, wherein the four frames are provided with a hollow structure respectively.

8. The frame with the hinged cover according to claim 1, wherein the hollow structure comprises an upper hollow structure, a middle hollow structure and a lower hollow structure from top to bottom.

9. The frame with the hinged cover according to claim 8, wherein an upper end of the upper hollow structure is provided with an opening, the hinged cover main body is located in the upper hollow structure, and an lower end of the lower hollow structure is provided with an opening.

10. The frame with the hinged cover according to claim 6, wherein the frame with a hinged cover further comprises a keel, and the keel is configured to support the filter screen.

\* \* \* \* \*